July 20, 1948.  S. B. GRIMSON  2,445,668
COLOR CAMERA

Filed Oct. 4, 1946  2 Sheets-Sheet 1

INVENTOR
*Samuel B. Grimson*
BY
*Darby & Darby*
ATTORNEYS

July 20, 1948.  S. B. GRIMSON  2,445,668
COLOR CAMERA
Filed Oct. 4, 1946  2 Sheets-Sheet 2
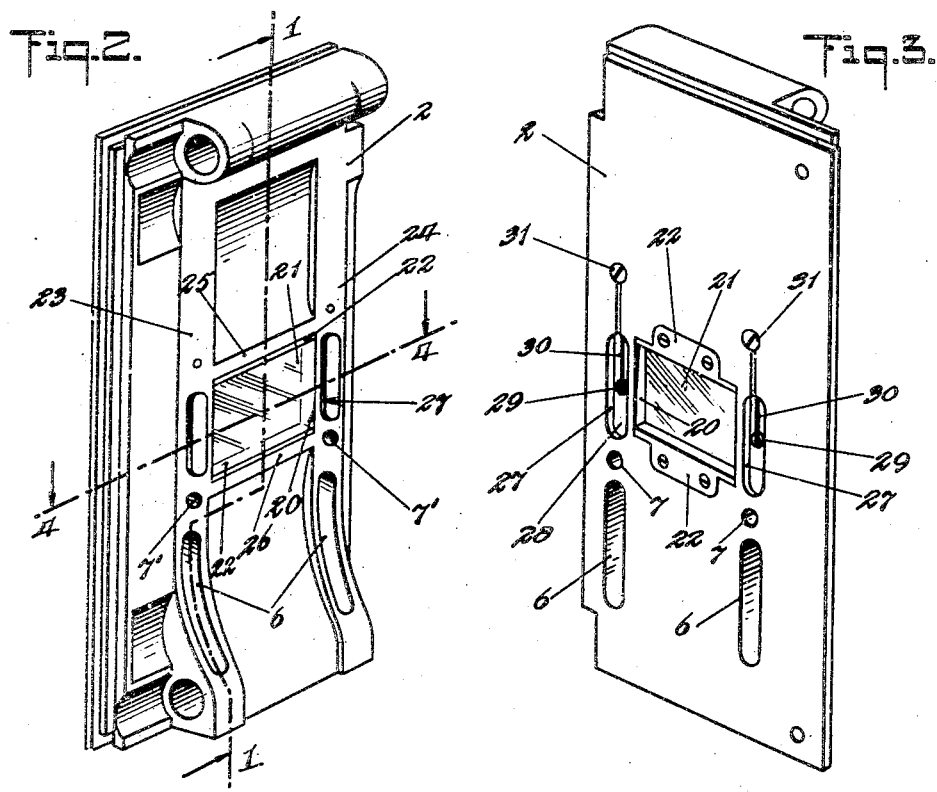
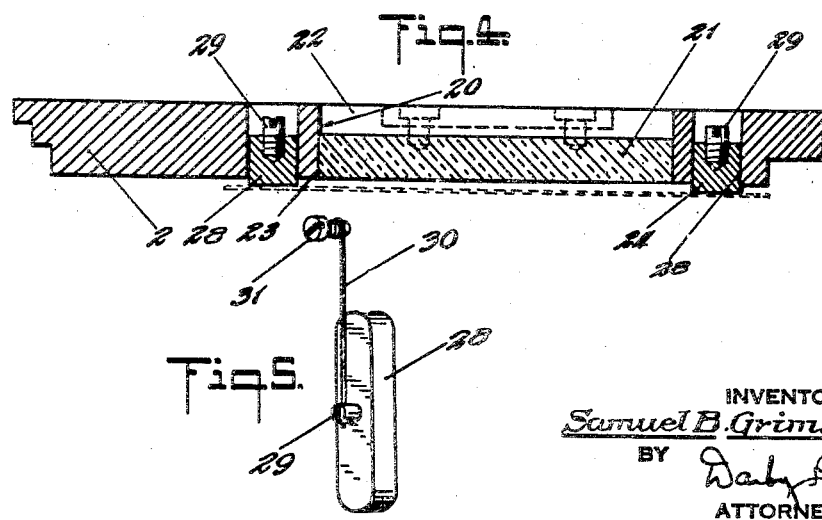
INVENTOR
Samuel B. Grimson
BY
Darby & Darby
ATTORNEYS, Patented July 20, 1948

2,445,668

UNITED STATES PATENT OFFICE 2,445,668

COLOR CAMERA

Samuel B. Grimson, New York, N. Y., assignor to Color Research Corporation, New York, N. Y., a corporation of Delaware Application October 4, 1946, Serial No. 701,180

6 Claims. (Cl. 88—16.4)

This invention relates to improvements in motion picture cameras for taking pictures which can be reproduced in color.

An object of this invention is to provide improvements in motion picture cameras for taking pictures suitable for reproduction in color by the color reseau process.

More specifically this invention relates to improvements of this type which may be applied to the well known Mitchell camera.

A more detailed object of the invention is to provide a novel method of mounting a color-matrix or reseau in the aperture plate of the camera.

Another object of the invention is to provide a mechanism for noiselessly moving the film out of contact with the aperture plate during the periods of movement of the film in its usual step-by-step movement.

Still another object of the invention is to provide a mechanism for insuring a substantially uniform contact between the film and the color-matrix or reseau during taking.

Still another object of the invention is to provide cleaning mechanism for the film operative to clean the film before it reaches the aperture plate.

Other objects of the invention will be apparent from the following description of the embodiment thereof disclosed in the attached drawings.

This invention resides substantially in the combination, construction, arrangement and relative location of parts, all as will be set forth in full detail hereinafter.

In the accompanying drawings—

Figure 2 is a perspective view of the aperture plate from the inside of the camera;

Figure 3 is a similar view from the outside;

Figure 4 is a cross-sectional view taken on the line 4—4 of Figure 2; and

Figure 5 is a detailed perspective view of one of the shoes which move the film out of contact with the aperture plate during the pull-down operation.

Figure 1:
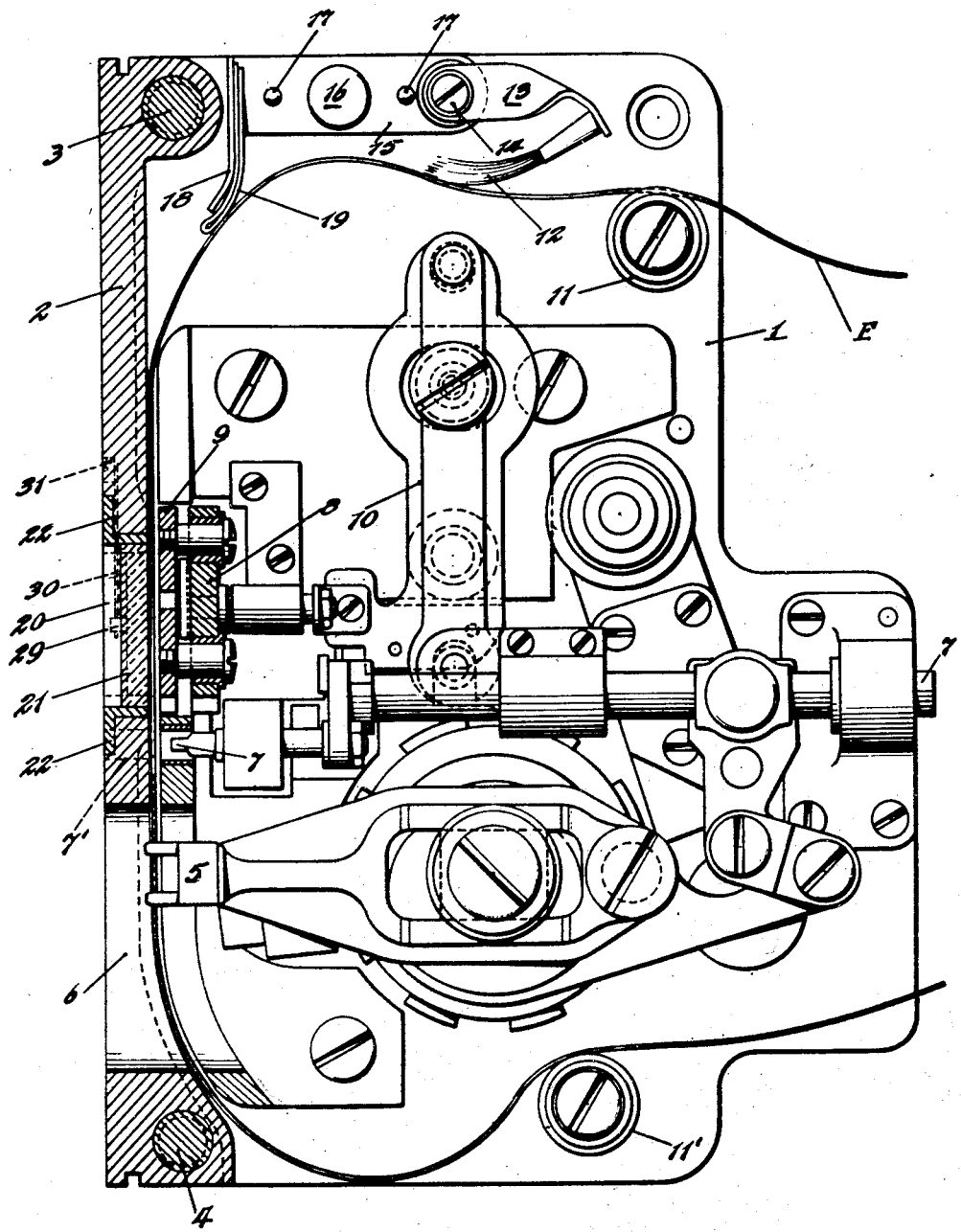
Figure 1 is a side elevational view partly in vertical cross section on the line 1—1 of Figure 2 of the film pull-down mechanism of a Mitchell camera.

The two best known color photography processes employing a color-matrix or reseau are the Finlay and the Dufay processes. In the Finlay process the color-matrix is printed on a glass plate and the sensitized plate upon which the picture is to be taken is placed in intimate contact with the printed side of the color-matrix during exposure. The exposed plate is developed afterward as a separate black and white record of the scene photographed. This record can be viewed in color by placing it in contact with a similar color-matrix properly registered therewith. In the Dufay process the color-mixture is printed on a transparent film which is then coated with a sensitive emulsion. After exposure and development the recorded picture appears in color, the matrix and the developed record being inseparable.

The Finlay color-matrix being very course, the glass plates are of necessity quite large, and therefore difficult to clean when placing the sensitized plate in contact with them, and a further difficulty lies in securing perfect contact over so large an area.

In the Dufay process the color-matrix being printed on the transparent film base is continuous throughout the length of the film. It is well known that color-matrices or reseaus are difficult and expensive to make and even with the greatest care contain many blemishes which interfere greatly with the quality of the pictures produced thereby.

The invention herein disclosed is concerned with a camera which can be used with a color-matrix separate from the sensitive film. The basic elements of this invention are a color-matrix suitable for motion picture work which due to its small size can be made substantially physically perfect in combination with means to insure that the film immediately before contact with the color-matrix is entirely free from dust particles, and means to move the film noiselessly away from or out of contact with the color-matrix while it is in the process of being pulled down. The combination is further characterized in that after pull-down the film is noiselessly brought back into contact with the color-matrix by a suitable pressure pad, which insures intimate contact of the area to be exposed with the color-matrix. The practical utility of such a combination is that neither the color-matrix nor the film will be marred during the process.

In view of the above it will be seen that a broad object of this invention is to obtain a motion picture record in black and white of a scene in color which may after development be utilized to reproduce the scene in its original color by recombining it either physically or optically with a color-matrix similar to that employed in photographing the scene.

The portion of the mechanism of a Mitchell camera which has been illustrated in Figure 1 will be referred to only briefly because it is a well known mechanism in this art. As illustrated, there are certain features of improvement with which this invention is not concerned but with respect to which a full and detailed disclosure will be found in applicant's Patent No. 2,373,243, granted April 10, 1945.

As illustrated, the operating mechanism is mounted upon a supporting plate 1. The aperture plate 2 is detachably secured to the plate 1 by means of machine screws 3 and 4 so that the two plates are held in right angle relationship as illustrated. The usual pull-down claw 5 is provided with film perforation engaging pins which oscillate in the vertical slot 6 in the aperture plate in a well known manner.

Much of the mechanism illustrated is for effecting this oscillating motion which is accompanied by a movement of the claw towards and away from the aperture plate as is well understood. As is usually the case the registering pins 7, which pass through the perforations of the film and into the apertures 7' in the aperture plate, are mounted on a reciprocable shaft 7 and at the proper time enter the perforations to accurately position the firm in the aperture. Some of the mechanism illustrated is for reciprocating the shaft 7 at the proper time. Slidably mounted on a plate 8 is a spring biased pressure shoe 9 employed as disclosed in the above patent for clamping the film against the aperture plate in the region of the aperture. The plate 8 is mounted upon a lever 10 which can oscillate to cause this clamping action at the proper time and the remainder of the illustrated mechanism is for effecting this oscillation at the proper time. The mechanism so far described is referred to to provide a background for the improvements of this invention but this mechanism forms no part of the novel subject matter herein disclosed.

The film F which is the usual motion picture film passes from the supply reel, not shown, over a guide roller 11 mounted on the plate 1 to the guideway of which the aperture plate 2 forms one side. It passes down along the aperture plate issuing at the bottom thereof, around the guide roller 11' and back to the take-off reel, not shown. The normal movement and feed of such a film will cause it to tend to arch upwardly between the guide roller 11 and the entrance to the guideway. Advantage is taken of this to provide mechanism for cleaning lint, dust and other forms of material from the face of the film which engages the aperture plate. The cleaning mechanism includes a brush 12, preferably of sable which is of a width equal to the width of the film. This brush is mounted upon an arm 13 which is pivotally adjustable on a screw 14 attached to the bracket 15. The bracket 15 is detachably secured to the plate 1 by means of a locking member 16 of any suitable construction and is accurately positioned by means of the registration pins 17. The bracket 15 is provided with an integral downwardly extending arm 18 upon which is mounted a pad of velvet or other suitable cleaning fabric 19 also having a width substantially equal to the width of the film. The natural upward pressure which the film in its normal movements creates against the brush 12 and the pad 19 serves effectively to remove all of the dust, lint and the like from the film just before it enters the guideway.

The aperture plate 2 is provided with the exposure aperture 20 in which is mounted a colormatrix or reseau of any suitable construction. For example, this reseau may consist of an optical flat of glass upon which is printed or otherwise applied in the form of extremely small dots or bars the usual colors red, green and blue. The glass plate 21 is secured to a pair of L-shaped brackets 22 in any suitable manner as by cementing. These brackets fit into the aperture plate 2 and serve to secure the glass plate in place. The brackets may be attached by machine screws as shown. Referring to Figure 2, it will be seen that the inner face of the aperture plate is so constructed as to form a raised frame about the aperture. This frame comprises the side rails 23 and 24 and the top and bottom rails 25 and 26 by undercutting the aperture plate as illustrated. A raised rectangular frame lies around the periphery of the opening 20 with all of the surfaces 23, 24, 25 and 26 in the same plane and in the plane of the inner colored face of the glass plate 21.

In the region of the rails 23 and 24 are a pair of elongated apertures 27 which extend along the sides of the aperture 20 for a distance substantially equal to the width thereof. Slidably mounted in these apertures are a pair of shoes 28 which are mounted so as to be spring loaded. Referring to Figure 4, it will be seen that these shoes are provided with screws 29 having slotted heads in which the ends of a straight spring wire 30 rest. If desired, to prevent the shoes from falling away from the wires 30, the slotted heads may have a snap or pinching cooperation with the ends of the wires 30 to prevent their disengagement. The other ends of these wires are locked to the aperture plate by set screws 31. From a study of the figures it will be seen that the spring wires 30 urge the shoes 28 rearwardly or in the direction to move the film out of contact with the raised aperture framing surfaces 23, 24, 25 and 26. When the pressure shoe 9 is withdrawn during periods of step-by-step movement of the film, these shoes serve to prevent scratching of the film by moving it out of contact with the raised surface and the color reseau during this movement. It will be understood, of course, that the pressure shoe 9 extends transversely throughout the width of the film so that it acts to retract the pressure shoes 28 back to a flush position with the raised surfaces 23 and 24 when the pressure plate is clamping the film in the aperture. It will be noted that the shoes 28 engage the film outside of its picture or frame area so that any scratching that they might cause will not mar the picture area and further cause the film to follow the reciprocating motion of the pressure plate so closely as to be entirely noiseless in operation.

It will be understood that the cleaning mechanism insures that the film will arrive at the aperture plate in a clean condition. This is important in order that the film will lie as nearly perfectly in contact with the inner face of the reseau 21 as is possible to obtain a practical operation. The pressure shoe will of course act to cause the film to contact the reseau throughout its area with an efficiency depending upon how little dust and lint lies between the film and the reseau. The pressure shoes 28 will insure that during the pull-down operation the film will not drag along the raised surfaces outlining the aperture plate, minimizing the usual tendency to scratch the film and any tendency to mar the color reseau.

As this disclosure is directed to those skilled in the art they will readily appreciate that some modification of the novel features herein disclosed are possible without departure from the new subject matter. I do not, therefore, desire to be strictly limited to the specific embodiments employed for illustrating this novel subject matter and therefore rely on the claims for the purpose of defining it.

What is claimed is:

1. In a color camera the combination with an aperture plate having a color reseau mounted therein, intermittent film feeding mechanism and a reciprocable pressure plate actuated therewith, said pressure plate holding the film against said color reseau when the film is stationary, of means for disengaging the film from the color reseau during periods of film movement.

2. In the combination of claim 1 the aperture of said plate being defined by raised surfaces, said reseau having one face lying in the plane of said raised surfaces.

3. In the combination of claim 1 said film disengaging means comprising a pair of resiliently mounted pressure shoes disposed at the sides of said aperture so as to engage the film.

4. In a color camera the combination with an aperture plate having an aperture therein defined by raised surfaces, a color reseau mounted in said aperture in the plane of said raised surfaces, a reciprocable pressure plate, film feeding mechanism operating in timed relation therewith, the pressure plate clamping the film when stationary against said surfaces and reseau, means for disengaging the film from the raised aperture defining areas during periods of film movement, film cleaning means positioned to clean the film just before it moves into registry with said reseau, said aperture plate and pressure plate forming a film guideway, and means for supporting the film in a curved path in advance of the guideway, said film cleaning means being resiliently engaged by the film at its point of curvature, the natural resiliency of the film holding it against said cleaning means.

5. In a color camera the combination with an aperture plate having an aperture therein defined by raised surfaces, a color reseau mounted in said aperture in the plane of said raised surfaces, a reciprocable pressure plate, film feeding mechanism operating in timed relation therewith, the pressure plate clamping the film when stationary against said surfaces and reseau, means for disengaging the film from the raised aperture defining areas during periods of film movement, film cleaning means positioned to clean the film just before it moves into registry with said reseau, said aperture plate and pressure plate forming a film guideway, and means for supporting the film so that it follows a curved path therefrom to the guideway, said film cleaning means comprising wiping devices engaged by the film under the pressure due to the natural resiliency of the film.

6. In a color camera the combination with an aperture plate having an aperture therein defined by raised surfaces, a color reseau mounted in said aperture in the plane of said raised surfaces, a reciprocable pressure plate, film feeding mechanism operating in timed relation therewith, the pressure plate clamping the film when stationary against said surfaces and reseau, means for disengaging the film from the raised aperture defining areas during periods of film movement, film cleaning means positioned to clean the film just before it moves into registry with said reseau, said aperture plate and pressure plate forming a film guideway, and means for supporting the film so that it follows a curved path therefrom to the guideway, said film cleaning means comprising a detachable support having a pair of spaced film wiping devices mounted thereon so as to engage the film at a point in said curved path and at the point of entry into said guideway.

SAMUEL B. GRIMSON.

REFERENCES CITED

The following references are of record in the file of this patent:

UNITED STATES PATENTS

| Number | Name | Date |
| --- | --- | --- |
| 1,926,981 | Gould, Jr. | Sept. 12, 1933 |
| 1,927,284 | Howell | Sept. 19, 1933 |
| 1,927,887 | Crespinel | Sept. 26, 1933 |
| 1,933,084 | Allison | Oct. 31, 1933 |
| 1,944,228 | Fairall | Jan. 23, 1934 |
| 1,972,973 | Bauer | Sept. 11, 1934 |
| 2,063,016 | Ames | Dec. 8, 1936 |
| 2,199,305 | Dewey | Apr. 30, 1940 |
| 2,255,038 | Grimson | Sept. 9, 1941 |
| 2,373,243 | Grimson | Apr. 10, 1945 |
| 2,408,438 | Mills | Oct. 1, 1946 |

FOREIGN PATENTS

| Number | Country | Date |
| --- | --- | --- |
| 9,610 | Great Britain | Apr. 24, 1913 |
| 11,496 | Great Britain | May 17, 1913 |